(12) United States Patent
Shimokuni et al.

(10) Patent No.: US 7,693,063 B2
(45) Date of Patent: Apr. 6, 2010

(54) COMMUNICATION CONTROL APPARATUS AND COMMUNICATION CONTROL METHOD

(75) Inventors: Osamu Shimokuni, Kawasaki (JP); Akira Jinzaki, Kawasaki (JP); Jun Kawai, Kawasaki (JP); Junichiro Shitami, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 983 days.

(21) Appl. No.: 11/230,250

(22) Filed: Sep. 19, 2005

(65) Prior Publication Data

US 2006/0280203 A1 Dec. 14, 2006

(30) Foreign Application Priority Data

Jun. 14, 2005 (JP) ............................. 2005-173973

(51) Int. Cl.
*G01R 31/08* (2006.01)
(52) U.S. Cl. .................... 370/235; 370/229; 370/400; 380/28; 380/277; 713/150
(58) Field of Classification Search ................ 370/230, 370/230.1, 231, 232, 233, 234, 236.2, 237, 370/351, 352, 357, 342, 390, 235, 238, 396, 370/389, 400, 412, 437, 445, 465; 709/215, 709/214, 226; 380/277, 247, 273, 278, 286, 380/44, 279, 28, 284, 45; 713/183, 150, 713/182, 165, 153, 189, 168; 455/25, 101, 455/423, 452.2, 561, 410, 414.3; 726/6, 726/27, 26; 375/296
See application file for complete search history.

(56) References Cited

U.S. PATENT DOCUMENTS

| | | | | |
|---|---|---|---|---|
| 5,485,147 A * | 1/1996 | Jaffe et al. | ................... | 370/445 |
| 5,708,710 A * | 1/1998 | Duda | ......................... | 380/247 |
| 6,182,214 B1 * | 1/2001 | Hardjono | .................... | 713/163 |
| 6,192,472 B1 * | 2/2001 | Garay et al. | ................ | 713/165 |
| 6,469,991 B1 * | 10/2002 | Chuah | ........................ | 370/329 |
| 6,483,808 B1 * | 11/2002 | Rochberger et al. | ......... | 370/238 |
| 6,839,436 B1 * | 1/2005 | Garay et al. | ................ | 380/278 |
| 6,871,066 B1 * | 3/2005 | Khullar et al. | ............. | 455/423 |
| 7,325,141 B2 * | 1/2008 | Chow et al. | ................. | 713/183 |
| 7,363,346 B2 * | 4/2008 | Groner et al. | ............... | 709/214 |
| 2003/0147535 A1 * | 8/2003 | Nadooshan et al. | ......... | 380/277 |
| 2003/0181163 A1 * | 9/2003 | Ofuji et al. | .................... | 455/25 |
| 2003/0221131 A1 * | 11/2003 | Mori et al. | .................. | 713/202 |
| 2004/0025018 A1 * | 2/2004 | Haas et al. | .................. | 713/168 |
| 2004/0177255 A1 * | 9/2004 | Hughes | ...................... | 713/189 |
| 2004/0179686 A1 * | 9/2004 | Matsumura et al. | .......... | 380/44 |
| 2004/0213229 A1 * | 10/2004 | Chang et al. | ................ | 370/390 |

(Continued)

FOREIGN PATENT DOCUMENTS

JP 2004-274703 9/2004

(Continued)

*Primary Examiner*—Aung S Moe
*Assistant Examiner*—Abdullah Riyami
(74) *Attorney, Agent, or Firm*—Katten Muchin Rosenman LLP

(57) ABSTRACT

A communication control apparatus for enabling a quality of service (QoS) to be maintained, the security against interception to be ensured, and a communication route to be switched over without any interruption of communications, and capable of restraining the processing time and the number of adjusting parameters. The communication control apparatus including a coding unit, an allocation unit, and a sending unit.

10 Claims, 8 Drawing Sheets

U.S. PATENT DOCUMENTS

| | | | |
|---|---|---|---|
| 2004/0254967 A1* | 12/2004 | Cachin | 708/250 |
| 2005/0036624 A1* | 2/2005 | Kent et al. | 380/277 |
| 2005/0053045 A1* | 3/2005 | Chmora et al. | 370/338 |
| 2005/0111657 A1* | 5/2005 | Lee et al. | 380/28 |
| 2005/0163045 A1* | 7/2005 | Randriamasy | 370/229 |
| 2005/0227698 A1* | 10/2005 | Nonin et al. | 455/452.2 |
| 2006/0105740 A1* | 5/2006 | Puranik | 455/410 |
| 2006/0239291 A1* | 10/2006 | Birchler et al. | 370/437 |
| 2007/0150965 A1* | 6/2007 | Redlich et al. | 726/27 |
| 2007/0263874 A1* | 11/2007 | Harran et al. | 380/277 |
| 2008/0044027 A1* | 2/2008 | Van Dijk | 380/278 |

FOREIGN PATENT DOCUMENTS

| | | |
|---|---|---|
| JP | 2004-529533 | 9/2004 |
| JP | 2005-057487 | 3/2005 |
| WO | WO 02/067497 | 8/2002 |

* cited by examiner

COMMUNICATION CONTROL APPARATUS AND COMMUNICATION CONTROL METHOD

BACKGROUND OF THE INVENTION

1. Field of the Invention

The present invention relates to a communication control apparatus and a communication control method.

2. Description of the Related Art

At the present, there exist a variety of communication networks such as a mobile network, Hot spot (registered trademark) and the Internet. Then, in these communication networks, respective technologies support keeping a communication quality (quality of service: QoS), ensuring the security against interception and switching over a communication route without any interruption of the communications.

Generally, an advanced error correcting code is applied to keeping the quality of service (QoS). The advanced error correcting code is a coding method in a way of adding a redundant piece of information to digital data. Then, the advanced error correcting code is a method of correcting, if an error occurs in part of the coded digital data due to a noise etc. during a transfer of the digital data, this error with the redundant information added to the digital data. A case of applying the advanced error correcting code to packet communications across the Internet is stated. In the case, a packet size increases depending on the redundant information added to the data. Further, when the packet size increases, a congestion gets easy to occur on the communication control apparatus in the communication network. Then, when the congestion occurs on the communication control apparatus in the communication network, the packets equal to or more than an error-correctable quantity of the packets might be discarded. Hence, avoidance of this congestion needs having a width in time, when sending the packets, thereby avoiding the congestion. From this point of view, the advanced error correcting code has a defect that the packet size becomes large and a defect that a processing delay gets large because of adjusting the time width for sending the packets.

As for ensuring the security against the interception, IPsec (IP security protocol) is a general protocol. This method is a technology scheming to make an interceptor unable to decrypt a content of the communication information by encrypting the information with an algorithm such as DES (Data Encryption Standard) and AES (Advanced Encryption Standard).

On the other hand, a general technology for switching over the communication route without any interruption of the communications is a multihoming technology for ensuring a communication route to which the communication route is switched over while ensuring the in-use communication route, and switching over the communication route by taking synchronization between a transmitting terminal and a receiving terminal. SCTP (Stream Control Transmission Protocol) is given as a transport layer protocol that supports the connection between the plurality of routes that employs the multihoming technology. In addition to the switching method of switching over the communication route by taking the synchronization, there exists a method of transmitting the same packet to both of a new communication route and an old communication route by multicasting.

As described above, the technologies respectively support keeping the QoS, ensuring the security against the interception and switching over the communication route without the interruption of the communications. Hence, a defect is that the processing time for sequentially executing these technologies is needed.

Further, a variety of adjusting parameters are required for implementing these technologies, and therefore the communication control apparatus is required to hold a great number of these adjusting parameters.

The following are related arts to the present invention.

[Patent document 1] Japanese Patent Application Laid-Open Publication No. 2004-274703
[Patent document 2] Japanese Patent Application Laid-Open Publication No. 2005-57487
[Patent document 3] Japanese Unexamined Patent Publication No. 2004-529533

SUMMARY OF THE INVENTION

It is an object of the present invention to provide a technology enabling a quality of service (QoS) to be kept, the security against interception to be ensured and a communication route to be switched over without any interruption of communications, and capable of restraining the processing time and the number of adjusting parameters.

The present invention adopts the following structures in order to solve the problems.

(1) Namely, a communication control apparatus of the present invention comprises coding means coding by such a type of coding method that, when communication information is divided into a plurality of information blocks by said type of coding method, a number of the information blocks equal to or larger than a predetermined threshold value are needed in order to decode the information blocks into the original communication information, allocating means allocating, when there are two or more usable communication routes in the case of sending the information blocks to a partner communication apparatus, the information blocks to each of the communication routes in such a way that the number of information blocks to be sent per communication route is set less than the threshold value required for decoding the information blocks, and means sending the allocated number of information blocks to each of the communication routes.

According to this structure, the apparatus on the receiving side receives the information blocks from the plurality of communication routes and can, when a number of the received information block exceed a certain threshold value, decode the information blocks into the communication information. Accordingly, even when the transmission of the information blocks on a certain communication route is delayed, a shortage of the information blocks can be supplemented by the information blocks given from other communication routes. Therefore, for example, even if a jitter becomes large on a certain communication route, the shortage thereof can be supplemented by the information blocks given from other communication routes, and hence, as a result, the jitter can be restrained. Further, it is impossible to decode into the communication information from a total number of the information blocks flowing through one communication route, so that, for instance, even if all the information blocks on a communication route are intercepted, the security of the information transmitted by the communication control apparatus can be ensured. Moreover, the apparatus on the receiving side, because of a characteristic that this apparatus can decode the information blocks into the communication information if the number of the information blocks flowing through the plurality of communication routes is equal to or larger than the threshold value and of a characteristic that the information blocks flowing through the plurality of communication routes are controlled by changing the number of the information blocks allocated to the communication routes, can switch over, for example, the communication route without any interruption of the communications.

(2) Further, in the communication control apparatus of the present invention, the coding means may use an SSS (Secret Sharing Scheme) coding method.

According to this structure, the SSS-coding method can be employed for the coding means.

(3) Moreover, in the communication control apparatus of the present invention, the allocating means may further include means calculating an evaluation value representing a communication quality of every communication route, and means allocating the information blocks at a predetermined rate in order of the largest evaluation value among the communication routes.

According to this structure, the information blocks are allocated in the sequence from the communication route exhibiting the largest evaluation value representing the quality of service (communication quality), and hence the information blocks can be distributed according to a communication seed on the communication route in a case where the evaluation value representing the QoS is dominantly determined by the evaluation value of the communication speed.

(4) Still further, a communication control apparatus of the present invention comprises receiving means receiving information blocks defined as communication information coded by such a type of coding method that, when communication information is divided into a plurality of information blocks by said type of coding method, a number of the information blocks equal to or larger than a predetermined threshold value are needed in order to decode the information blocks into the original communication information, and means decoding the information blocks the information blocks into the communication information by using the information blocks with a number of the threshold value needed for decoding the information blocks received by the receiving means into the communication information.

According to this structure, a communication control apparatus of the present invention is possible to decode the information blocks into the communication information by use of the information blocks of which the number is coincident with the threshold value needed for decoding into the communication information.

The present invention may also be a communication control method for executing the processes described above.

According to the present invention, it is feasible to enable the quality of service (QoS) to be kept, the security against interception to be ensured and the communication route to be switched over without the interruption of communications, and to restrain the processing time and the number of adjusting parameters.

DETAILED DESCRIPTION OF THE PREFERRED EMBODIMENT

Figure 1:
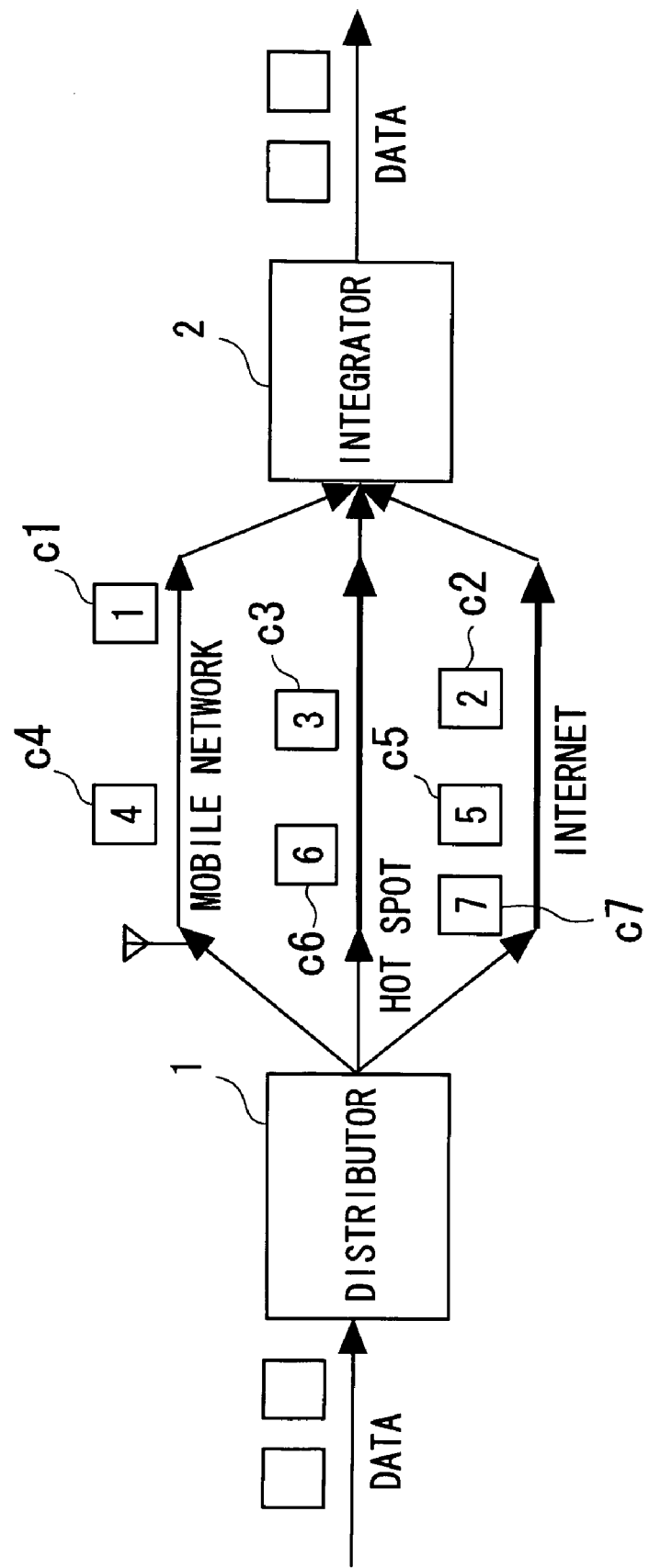
FIG. 1 is a diagram showing a system structure of a communication control apparatus of the present invention.

An embodiment of the present invention will hereinafter be described with reference to the drawings. The following embodiment is an exemplification, and the present invention is not limited to a structure of the embodiment.

<<Principle of Coding Communication Information>>

The embodiment of the present invention includes using an SSS (Secret Sharing Scheme) coding method for transmitting and receiving communication information. The SSS coding method is that one packet or a plurality of packets (communication information) is or are coded in a way that divides the packet(s) into n-pieces of information blocks. In the case, a packet binding count "S", a dividing count "n" of dividing into the information blocks and a decoding threshold value "m" ($<$n) are set as coding parameters used for coding. Then, if there are an arbitrary number of information blocks equal to or larger than the threshold value "m", the information blocks can be decoded into the communication information. Further, whereas if there are not the arbitrary number of information blocks equal to or larger than the threshold value "m", the information blocks can not be decoded into the communication information. Moreover, even if up to (n–m) pieces of information blocks disappear, remaining m-pieces of information blocks can be decoded into the communication information.

The SSS coding method uses solutions of linear simultaneous equations. N ($>$M) pieces of linear simultaneous equations having M-pieces of variables are considered as an example of the liner simultaneous equations. In this case, if there are the M-pieces of linear simultaneous equations, solutions of the M-pieces of variables can be obtained. On the other hand, the M-pieces of variables can not be obtained as specified values from the (M–1) pieces of liner simultaneous equations. The SSS coding utilizes the principle described above. Hence, transmission of SSS-coded data may be deemed to be the transmission of a coefficient matrix in the liner simultaneous equations having the M-pieces of variables. The SSS decoding is that the decoding can be executed upon the coefficient matrix in the liner simultaneous equations by making use of the principle for obtaining the solutions of the M-pieces of variables.

Further, the SSS coding method may not be applied to the present invention. For example, it is also possible to employ another method having such a characteristic that the communication information is divided into n-pieces of information blocks, and m ($<$n) is set as a threshold value, wherein if there are an arbitrary number of information blocks equal to or larger than the threshold value "m", the information blocks can be decoded into the communication information, and, whereas if there are not the arbitrary number of information blocks equal to or larger than the threshold value "m", the information blocks can not be decoded into the communication information.

Further, the characteristic of the coding method used in the present invention, i.e., the characteristic that the information blocks can be decoded if there are the arbitrary number of information blocks equal to or larger than "m" but can not be decoded unless there are the arbitrary number of information blocks equal to or larger than "m", is a characteristic that is not inherent to a method of an advanced error correcting code which is a method of adding redundant information to the communication information.

Embodiment

A communication control apparatus according to the embodiment of the present invention will be explained with reference to the drawings in FIGS. 1 through 3.

FIG. 1 is a diagram of a basic configuration of the communication control apparatus according to the embodiment. This communication control apparatus includes a distributor 1 on a transmitting side of the communication information and an integrator 2 on a receiving side of the communication information. FIG. 1 illustrates how the distributor 1 receives data (communication information) from a terminal to be connected, effects the SSS-coding upon the data, then divides the data into seven pieces of information blocks, and transmits the information blocks to the integrator 2 via three networks such as a mobile network, Hot spot (registered trademark) and the Internet. Further, FIG. 1 illustrates how the information blocks received by the integrator 2 are decoded into the original data and sent to the terminal to be connected. In FIG. 1, the information blocks, which are coded and sent by the distributor 1 toward the integrator 2, are expressed as rectangles marked with the numerals 1 through 7 and also designated at c1 through c7, respectively.

The distributor 1 receives the data transmitted from the terminal connected to the distributor 1. Then, the distributor 1 divides the received communication information into the information blocks and codes the information blocks. In the embodiment, the coding includes using the SSS coding method. Then, the distributor 1 sends the SSS-coded information blocks to the integrator 2 via communication routes in the plurality of networks such as the mobile network, Hop spot (registered trademark) and the Internet.

The integrator 2 receives the information blocks sent by the distributor 1 via the plurality of communication routes. Then, the integrator 2 converts the received information blocks into the pre-coding data by decoding these information blocks, and sends the decoded data to the terminal connected to the integrator 2.

Figure 2:
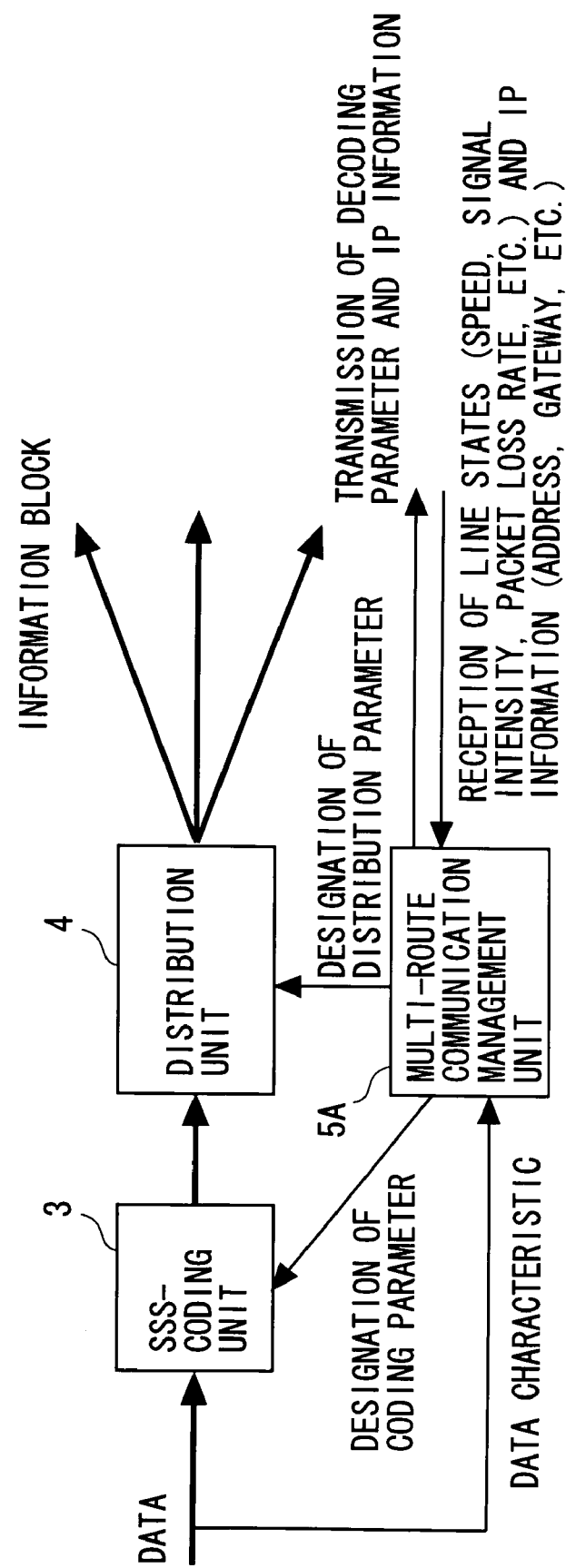
FIG. 2 is a diagram showing a system structure on a transmitting side of the communication control apparatus of the present invention.
Figure 3:
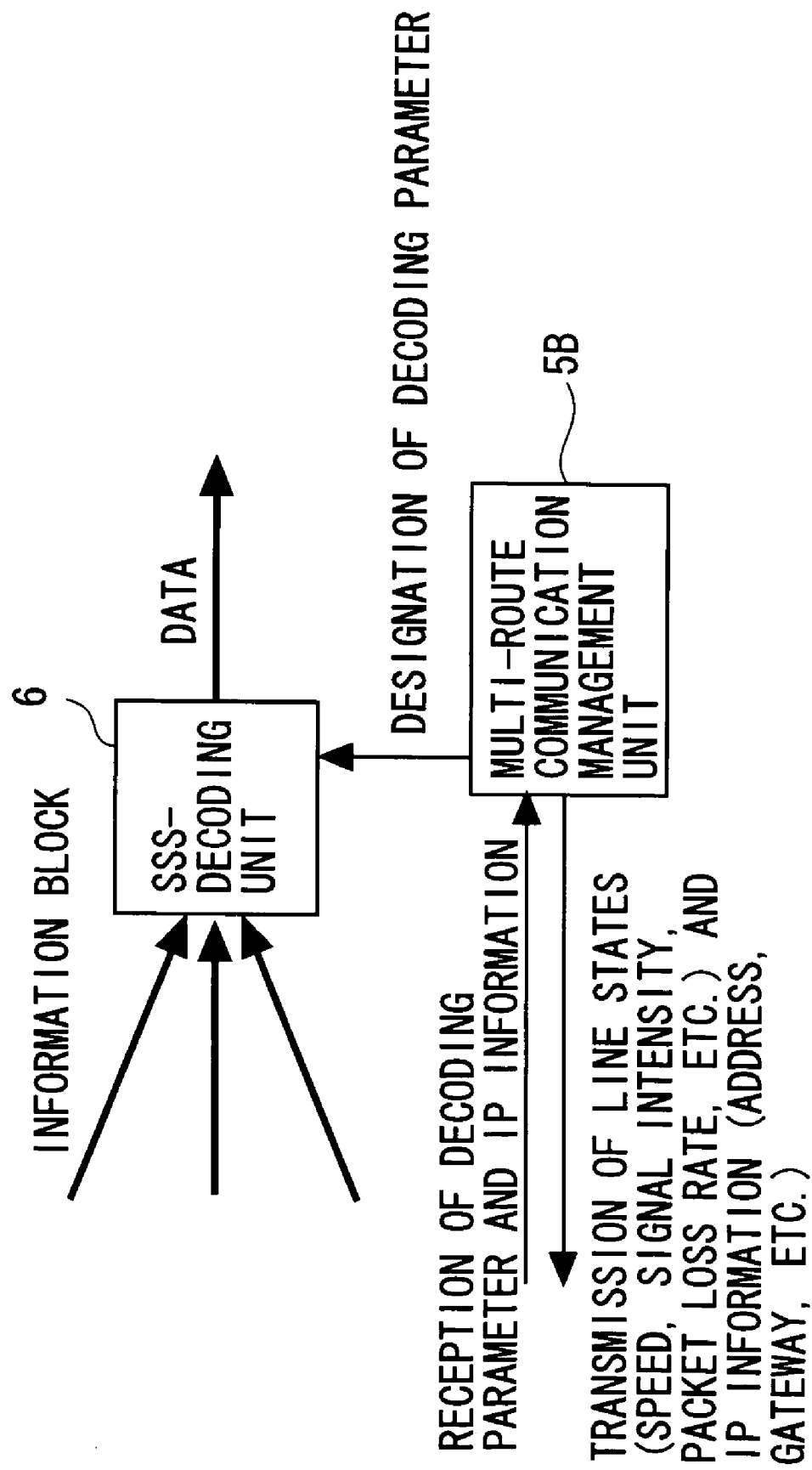
FIG. 3 is a diagram showing a system structure on a receiving side of the communication control apparatus of the present invention.

FIG. 2 is a block diagram showing a configuration of the distributor 1. The distributor 1 includes an SSS coding unit, a distribution unit 4 and a multi-route communication management unit 5A. Further, FIG. 3 is a block diagram showing a structure of the integrator 2. The integrator 2 includes an SSS decoding unit 6 and a multi-route communication management unit 5B. The description will at first touch on the structure of the distributor 1 in FIG. 2 and then touch on the structure of the integrator 2 in FIG. 3.

The SSS coding unit 3 receives the data from the terminal connected to the SSS coding unit 3. The SSS coding unit 3 receives a designation of a coding parameter used for coding the data from the multi-route communication management unit 5A. The designation of the coding parameter contains a data binding count (packet binding count) "S", an information block count "n" and a decoding threshold value "m". The SSS coding unit 3 divides, based on the designated coding parameter, a designated number of pieces of data into a designated number of information blocks, and SSS-codes the data so as to have a designated threshold value. The SSS-coding unit 3 corresponds to [coding unit] according to the present invention. Then, the SSS-coding unit 3 sends the coded data, i.e., the information blocks to the distribution unit 4.

The distribution unit 4 receives the SSS-coded data, i.e., the information blocks from the SSS-coding unit 3. Then, the distribution unit 4 receives a designation of a distribution parameter from the multi-route communication management unit 5A. The designation of the distribution parameter contains information about the partner communication device to which the information blocks are sent, a designation of the communication route to be employed, a designation of a distribution quantity of the information blocks to the respective communication routes, and a sequence of the communication routes to which the information blocks are sent. Then, the distribution unit 4 sends, based on the designation of the distribution parameter given from the multi-route communication management unit 5A, the information blocks to the integrator 2 via the plurality of communication routes. The distribution unit 4 corresponds to [sending unit] according to the present invention.

The multi-route communication management unit 5A transmits and receives pieces of information about line states such as a line speed, an intensity of a wireless signal, a packet loss rate (a loss rate of the information block), a magnitude of jitter and line usability/non-usability to and from the multi-route communication management unit 5B of the integrator 2 via the plurality of communication routes. Further, the multi-route communication management unit 5A may measure an intensity of the wireless signal transmitted from the partner communication device. Moreover, the multi-route communication management unit 5A transmits and receives pieces of information necessary for the communications, such as an IP address and a MAC (Media Access Control) address to and from the multi-route communication management unit 5B via the plurality of communication routes. The multi-route communication management unit 5A periodically checks these pieces of information and acquires, as a distribution parameter, an information block distribution way by use of the built-in central processing unit and the built-in memory. Then, the multi-route communication management unit 5A designates the distribution parameter in the distribution unit 4.

Further, the multi-route communication management unit 5A receives a data characteristic from the terminal to which the distributor 1 is connected. Information of the characteristic is, for instance, a port number of an application used on the terminal to which the distributor 1 is connected. Then, the multi-route communication management unit 5A may judge from this port number whether the application used on the terminal to which the distributor 1 is connected is a real-time application or not. Further, the multi-route communication management unit 5A, in a process of judging the data characteristic to be received, actually measures a data size and may use a result of this measurement as the data characteristic. Moreover, the multi-route communication management unit 5A may receive input data about the data characteristic from the connected terminal device, and may use the input data as the data characteristic.

Furthermore, the multi-route communication management unit 5A obtains a packet (communication information) binding count "S", the information block count "n" and the threshold value "m" from the data characteristic information, the intensity of the wireless signal, the line speed, the packet loss rate, the jitter magnitude, the line usability/non-usability, etc. by use of the central processing unit and the memory that are built in the multi-route communication management unit 5A, and designates these values as coding parameters in the SSS-coding unit 3.

Further, the multi-route communication management unit 5A notifies the multi-route communication management unit 5B in the integrator 2 of a decoding parameter required for the SSS-decoding.

Next, a configuration of the integrator 2 shown in FIG. 3 will be explained. The integrator 2 has the SSS-decoding unit 6 and the multi-route communication management unit 5B.

The multi-route communication management unit 5B transmits and receives the information about the line states such as the line speed, the intensity of the wireless signal, the packet loss rate, the jitter, the line usability/non-usability, etc. to and from the multi-route communication management unit 5A of the distributor 1 via the plurality of communication routes. Further, the multi-route communication management unit 5B transmits and receives the information necessary for the communications such as the IP address and the MAC address to and from the multi-route communication management unit 5A. Moreover, the multi-route communication management unit 5B receives the decoding parameter from the multi-route communication management unit 5A of the distributor 1. Still further, the multi-route communication management unit 5B designates the received decoding parameter as the decoding parameter in the SSS-decoding unit 6.

The SSS-decoding unit 6 receives the information blocks from the partner communication device via the plurality of communication routes. The SSS-decoding unit 6 corresponds to [receiving unit] according to the present invention. Further, the SSS-decoding unit 6 sequentially executes the process for decoding on the basis of the decoding parameter till the SSS-decoding unit 6 receives the information blocks of which the number exceeds the threshold value for decoding, and may complete the decoding just when the information block count comes to the threshold value "m". The SSS-decoding unit 6 corresponds to [decoding unit] according to the present invention. Further, the SSS-decoding unit 6 may, after registering the information blocks on the memory till the received information block count reaches the count in the threshold value "m", decode these information blocks into the communication information. Furthermore, the integrator 2, even when receiving the information blocks of which the number exceeds the threshold value, has no necessity of decoding these information blocks into the communication information. Hence, the SSS-decoding unit 6 may discard these information blocks unnecessary for the decoding. The SSS-decoding unit 6 sends the post-decoding data to the terminal connected to the SSS-decoding unit 6.

<<Application of SSS-Decoding Method>>

The SSS-decoding method is such that one packet or the plurality of packets may be coded. Accordingly, the packet binding count is one of the parameters for the execution of the coding. The packet binding count is set to "S". For others, the dividing count "n" of dividing into the information blocks and the decoding threshold value "m" are given as the parameters necessary for the SSS-coding. Herein, a method of determining "S", "n" and "m" will be explained. "S", "n" and "m" are determined as the coding parameters by the multi-route communication management unit 5A by use of the built-in central processing unit and the built-in memory. Then, the multi-route communication management unit 5A designates the coding parameters in the SSS-coding unit 3.

The original data (communication information) is divided into n-pieces of data by the SSS-coding. If one packet is simply is divided into n-pieces of packets, it follows that the plurality of short packets (having a small packet size) are to be generated, and hence a packet processing efficiency and a packet transmission efficient decrease. Accordingly, in the case of the SSS-coding, the packets may be coded in a way that binds some packets in consideration of the packet processing efficiency and the packet transmission efficiency.

Considered by way of an example is such a case that the SSS-coding unit 3 steadily receives the data having an s-byte data size from the terminal to be connected in the streaming communications etc. In the case, the databinding count "S" maybe selected as follows.

(1) The information block dividing count "n" may be set as the data binding count "S". At this time, each data size after being coded becomes substantially the same size of the original data. Hence, the information blocks can be transmitted and received substantially at the same processing efficiency and transmission efficiency as those of the normal packet.

(2) There may be considered a maximum transfer unit (MTU), i.e., "S" taking a maximum data size into consideration, which is transmissible at one time when transmitting the data. For example, let "1" be a minimum size in the maximum transfer unit (MTU) among the plurality of communication routes, there is obtained an integer part "b" of "a" in l=a×s/n, and this integer part "b" may be set as the data binding count "S". In this case, the data are coded by dividing the data into the n-pieces of information blocks after biding the communication information by S-pieces (b-pieces), and therefore the data size of the post-coding information block is given by S×s/n=b×s/n a×s/n=l, thus is to be contained within the maximum transfer unit (MTU). Accordingly, the divided-by-n information blocks can be sent at one time to the communication route in a way that binds the communication information by S-pieces (b-pieces).

(3) "S" may also be determined by judging from the port number whether the communication uses the real-time application or not. The real-time application needs to restrain a buffering delay caused due to the binding of the packets. Accordingly, when decreasing the data binding count "S", the suitable communications can be performed by the real-time application. Hence, the data binding count "S" may be dynamically changed, depending on the real-time property and the network efficiency that are requested by the respective applications.

Further, the application of the SSS-coding method requires determining the decoding threshold value "m". The threshold value "m" may be determined on the following guidelines. A loss rate of the information blocks through all of the plurality of communication routes employed between the distributor 1 and the integrator 2, is assumed to be "P". The loss rate "P" of the information blocks through all the plurality of communication routes is given by P=Ö$_i$ñ(i)×t(i)/n, where "i" is an index showing each communication route, t(i) is an information block count of the information blocks to be sent to the communication route "i", and ñ (i) is a loss rate of the information blocks on the communication route "i". Moreover, n×(1×P) represents an information block count of the information blocks reaching the partner communication device without any loss of the information blocks. Next is a case in which "m" in n×(1×P) <m is set as the decoding threshold value. In this case, the information blocks of "nP" in the information blocks sent by the distributor 1 are lost on the communication routes, and hence it can be estimated that the information blocks of which the number is equal to or larger than the decodable threshold value do not reach the integrator 2.

Accordingly, if n×(1×P) m, it can be estimated that the block count of the information blocks received by the integrator 2 exceeds the threshold value, and hence "m" can be determined under this condition. Further, a value of t(i) is a value known after determining the block count of the information blocks distributed to the respective communication routes. Accordingly, before t(i) is once obtained by the multi-route communication management unit 5A, a default value of "P" may also be used. For instance, "P" may be set to 0.1. Then, after the value of t(i) has been once obtained, the multi-route communication management unit 5A may use the value of t(i) for determining the coding parameter.

In the case of the execution, a value that may be used as a ratio (n/m) of the information block count "n" to the threshold value "m" is approximately 1.1 to 1.2. Further, the approximation of the threshold value "m" to the information block count "n" implies that the decoding can not be done unless the majority of information blocks divided are completely acquired. The setting of this threshold value "m" strengthens the security, and hence the value of (n/m) may be set to a value even more approximate to "1".

If the value of the information block count "n" is large, a processing load caused by executing the SSS-coding and a processing load caused by executing the SSS-decoding, i.e., the processing load on the SSS-coding unit 3 and the processing load on the SSS-decoding unit 6 respectively become large. Therefore, the value of "n" is set to a value corresponding to a throughput of the system.

<<Designation of Distribution Parameter>>

An operation that the multi-route communication management unit 5A sets the distribution parameter, will be explained with reference to a flowchart shown in FIG. 4. The multi-route communication management unit 5A designates this distribution parameter in the distribution unit 4.

Figure 4:
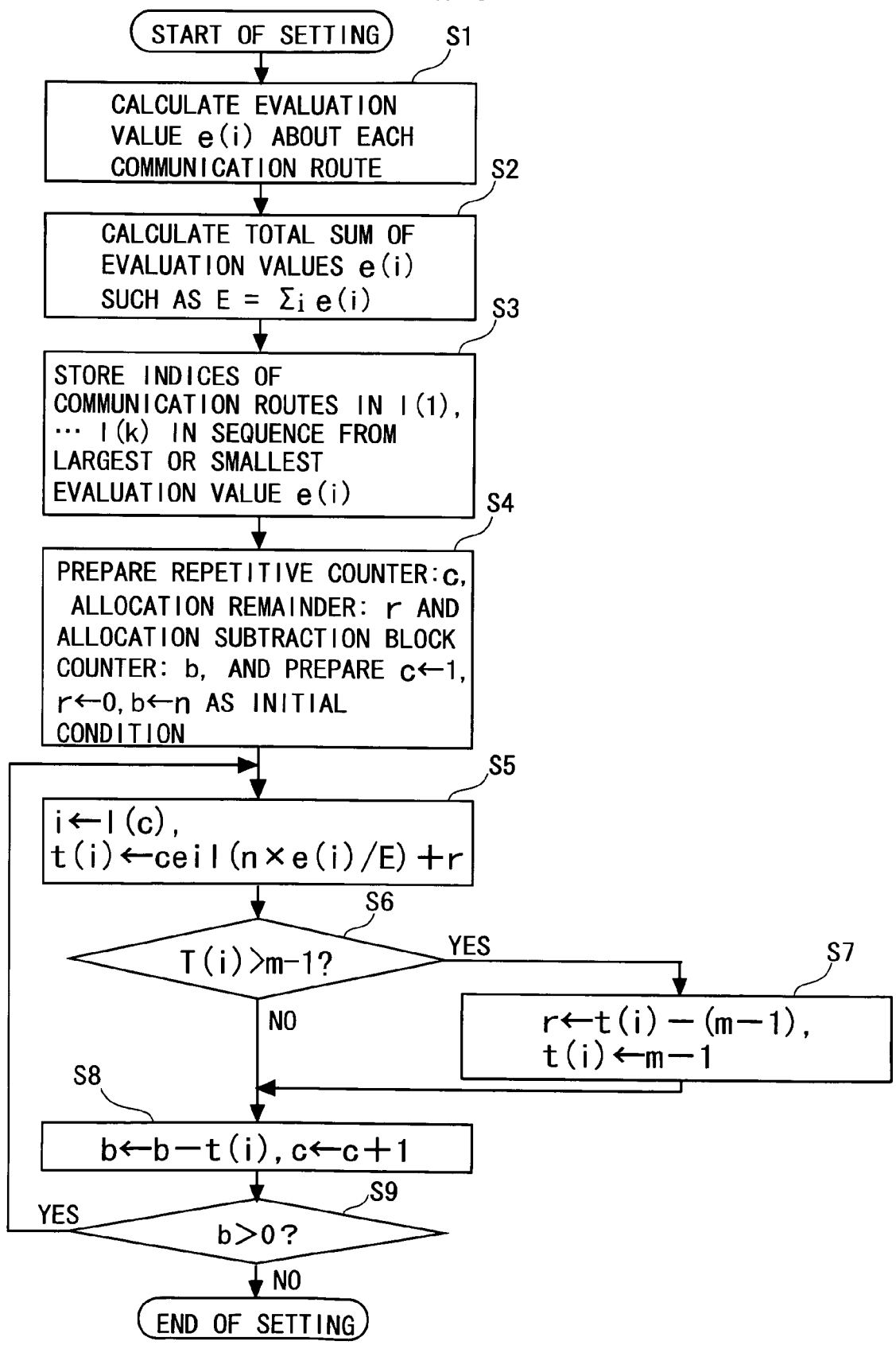
FIG. 4 is a flowchart showing an operation by which a multi-route communication management unit sets a distribution parameter.

The flowchart shown in FIG. 4 is an operational example of the multi-route communication management unit 5A in a case where there are two or more communication routes employed for the distributor 1 to send the information blocks to the integrator 2. If there is only one communication route used for the distributor 1 to send the information blocks to the integrator 2, the multi-route communication management unit 5A does not follow the flow chart hereafter. In the case, the distribution parameter may be designated in the distribution unit 4 so as to send the n-pieces of information blocks to one communication route.

The setting of the distribution parameter, i.e., the setting of allocating the information blocks to the plurality of communication routes, is shown by the processing based on the flowchart shown in FIG. 4. Herein, the information blocks are allocated to the communication routes in the sequence of the communication routes from the maximum evaluation value of a communication quality (QoS: Quality of Service) or in the sequence of the communication routes from the minimum evaluation value of the QoS. Then, an allocation count of allocating the information blocks to the communication routes is set at a ratio of a communication route evaluation value to an all-the-communication-route evaluation value. An detailed description of this allocation process will be made as below with reference to FIG. 4.

In FIG. 4, to begin with, let "i" be an index of the communication route employed for the communication from the distributor 1 to the integrator 2 and e(i) be an evaluation value about the communication route "i", and there is obtained a value of e(i) with respect to each communication route (i.e., with respect to each index "i") (S1). For example, the evaluation value e(i) is acquired from a transmission speed v(i) of the information block on the communication route "i", an information block loss rate f(i), a jitter Ó(i) and a wireless reception intensity I(i) in the case of a wireless communication route. For instance, the evaluation value e(i) may also be determined such as e(i)=v(i)(1−ñ(i))+aI(i)−bÓ(i), where the coefficients "a" and "b" are used as predetermined weights. Further, e(i) may be obtained by any types of formulae on condition that they are the formulae for evaluating the quality of service (QoS), and is not limited to the formula exemplified above.

Next, a total sum E of the evaluation values e(i) is calculated (S2). A communication route count of the usable communication routes for transmitting and receiving the information blocks between the distributor 1 and the integrator 2, is assumed to be "k". The total sum E of the evaluation values e(i) of the quality of service is given by $Ó_t^k e(i)$.

Next, the multi-route communication management unit 5A stores, by use of the built-in central processing unit, storage variables l(1) through l(k) for the indices of the communication routes that are the usable communication routes for sending the information blocks to the integrator in the sequence from the maximum evaluation value e(i) of the QoS or in the sequence from the minimum evaluation value e(i) in the built-in memory (S3). Hence, the storage variable l(1) for the index of the communication route represents the index of the communication route exhibiting the maximum or minimum evaluation value of the quality of service. Herein, in a case where the multi-route communication management unit 5A stores the indices of the communication routes in the sequence from the maximum evaluation value of the QoS and in a case where the evaluation value of the QoS is determined dominantly by the communication speed, the distribution parameter designated by the multi-route communication management unit 5A becomes a parameter designated for effecting a speed-oriented distribution of the information blocks. The multi-route communication management unit 5A corresponds to [unit allocating at a predetermined rate] according to the present invention. Next is a case of storing the indices of the communication routes in the sequence from the minimum evaluation value. In this case, there are allocated the information blocks of which the number corresponds to a ratio of the evaluation value in the sequence from the communication route exhibiting the minimum evaluation value. Therefore, the distribution parameter designated by the multi-route communication management unit 5A is a parameter for such a designation as to send the information blocks by employing as many communication routes as possible and to reduce the number of the information blocks flowing per communication route. Accordingly, this distribution parameter is a parameter for such a designation as to distribute security-oriented information blocks.

Next, three pieces of variables as given by a repetitive counter "c", an allocation remainder "r" and an allocation subtraction block counter "b", are prepared for processing in the multi-route communication management unit 5A. Then, an initial condition is set such that c 1, r 0 and b n (S4). Herein, "c" is used for indicating the index of the communication route, "r" is used for allocating a remainder of the information blocks produced by limiting the number of the information blocks sent on every communication route, and "b" is used for showing the number of the unallocated information blocks, respectively.

Next, a ceiling function "ceil(x)" is defined. The ceiling function "ceil(x)" is a function given by ceil(x)=min[n: A, n<=x], where N is a set of natural numbers, N represents a maximum integer part of a real number "x", and A represents that n belongs to set N. For instance, the ceiling function is expressed such as ceil (2.1)=2 ceil (1.9)=1. Then, the index of the communication route is extracted from the storage variable l(c) for the communication route index that corresponds to the counter value "c", and is set to "i". Further, the information block count of the information blocks to be sent through the communication route"i" is set to t(i). The information blocks are allocated so that the information block count t(i) is expressed such as t(i) ceil( n×e (i)/E)+r (S5). Namely, the information blocks corresponding to a ratio given by e(i)/E of the QoS evaluation value "e(i)" to the QoS evaluation value "E" of all the communication routes, are allocated to the communication routes. Herein, "r" is the allocation remainder produced by limiting the number of the information blocks sent per communication route, wherein "0" is substituted into this allocation remainder "r" under the initial condition.

Next, it is judged whether or not t(i) exceeds the maximum information block count "m−1" transmissible to one communication route (S6). In step S6, if t(i) exceeds m−1 (when t(i)>m−1), it follows that the decoding into the communication information can be done by use of only the information blocks flowing through one communication route. Hence, the judgment in step S6 is required for preventing the decoding into the communication information by use of only the information blocks flowing through one communication route.

In the case of Yes in step S6, i.e., when t(i)>m−1, it follows that the decoding into the communication information can be done by use of only the information blocks allocated to the communication route "i". Accordingly, the control is performed so that "t(i)" does not exceed "m−1", wherein r t(i)−(m−i), t(i) m−1. A value obtained by subtracting "m−i" from "t(i)" is given to "r" so that n-pieces of information blocks are all sent from the distributor 1.

Next, b b−t(i), c c+1 is carried out (S8) Herein, "b" represents the number of the information blocks that are not allocated and left in the last allocation process with respect to the value of t(i), and the initial condition thereof is b n. Further, "c" is the index (c=1, 2 . . . ) entered in the storage variable l(c) for the communication route index. The index "c" is employed for extracting the index (value of l(c)) of the communication route, and the initial condition is c 1.

Next, it is judged whether b>0 or not (S9). When b>0 in step S9, this implies that there are the not-yet-allocated information blocks. Accordingly, when b>0, there arises a necessity of allocating the information blocks to other communication routes, and hence the processing advances to step S5.

In the way described above, the multi-route communication management unit 5A can set the distribution parameter. Further, the multi-route communication management unit 5A designates this distribution parameter in the distribution unit 4.

Accordingly, the multi-route communication management unit 5A corresponds to [allocating unit] according to the present invention.

FIRST EXAMPLE

The communication control apparatus according to a first example of the present invention will be explained with reference to the drawing in FIG. 5.

A first example exemplifies that the communication control apparatus can keep the quality against the loss (disappearance) of the information blocks and can restrain the jitter (fluctuation) in the communication information.

Figure 5:
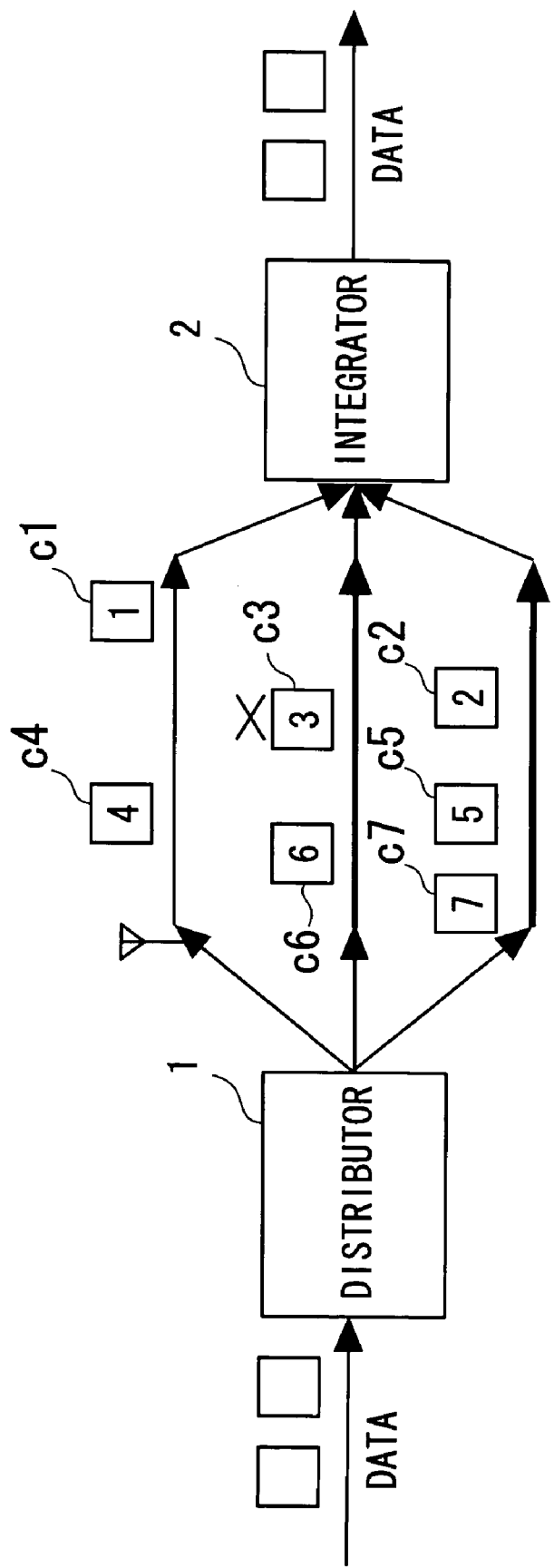
FIG. 5 is a diagram showing how the communication control apparatus of the present invention keeps a quality of service (QoS) and restrains a jitter.

FIG. 5 illustrates, in the same way as FIG. 1 shows, how the information blocks are sent from the distributor 1 to the integrator 2 via the plurality of communication routes. The components already explained referring to FIG. 1 are marked, in FIG. 5, with the same numerals and symbols as those in FIG. 1, and their explanations are omitted. Next explanation is an example in which the distributor 1 receives the data (the communication information) from the terminal connected to the distributor 1, and one packet or the plurality of packets (data) is or are coded and thus sent to the integrator 2. Herein, as the coding parameters, the data dividing count is set to "7", and the decoding threshold value is set to "5". Then, a case is considered, wherein among seven pieces of information blocks sent by the distributor 1, the information block sent third is to be lost due to a noise etc. on the communication route. FIG. 5 shows the respective information blocks formed in rectangular shapes marked with the numerals. The information block sent third by the distributor 1 is designated by "c3", and a mark "X" is depicted on this information block.

The case in FIG. 5 is that even if the information block depicted with the mark "X" sent third is lost and when the five pieces of information blocks among the remaining six information blocks are received by the integrator 2, the integrator 2 can acquire the pre-coding communication information from the five information blocks. Therefore, as a redundant information block count gets larger, i.e., as the value given by n−m becomes larger, this communication control apparatus gets stronger against the loss of the information blocks.

Further, the integrator 2 decodes the information blocks in the sequence from the information block received first and, as the information blocks of which the number is coincident with the threshold value can be decoded into the communication information from the top, may not therefore decode the information blocks of which the number exceeds the threshold value. Accordingly, the information blocks passing through the communication routes that are slow of receiving the information blocks may not all be handled for acquiring the communication information, and consequently the integrator 2 can restrain an influence of the jitter caused on the individual communication routes.

SECOND EXAMPLE

The communication control apparatus according to a second example of the present invention will be described with reference to the drawing in FIG. 6.

The second example exemplifies that this communication control apparatus can ensure the security against interception of the information blocks on the communication routes.

Figure 6:
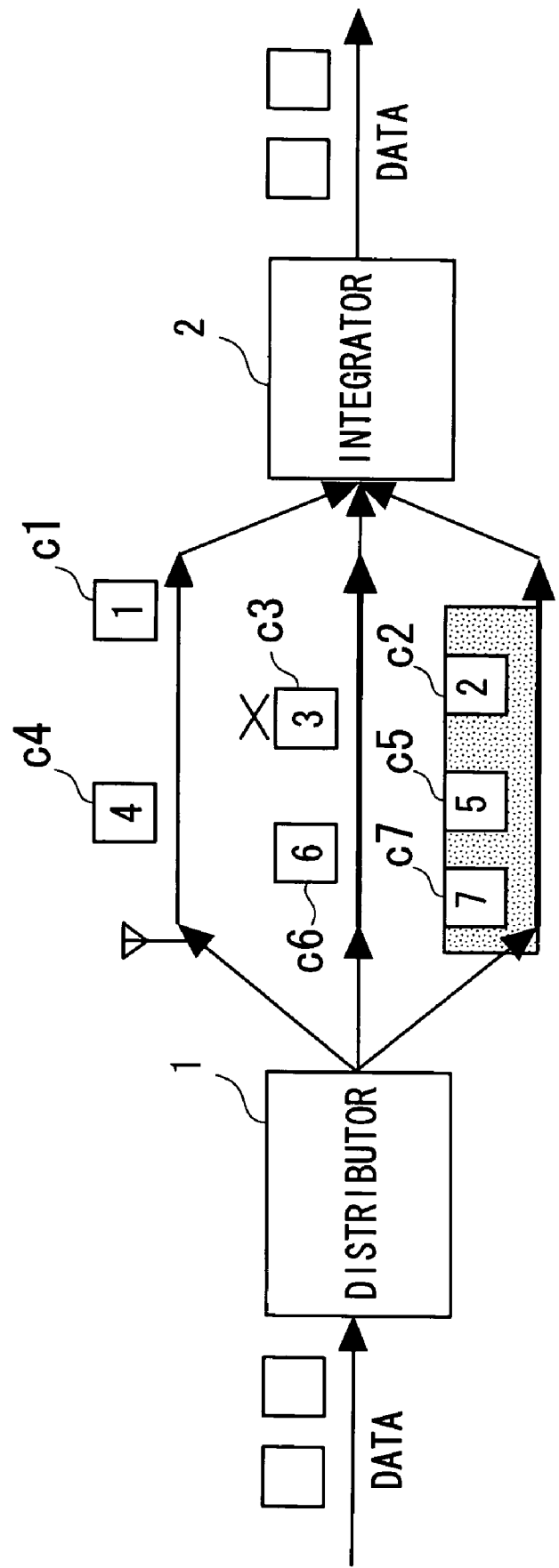
FIG. 6 is a diagram showing how the communication control apparatus of the present invention ensures the security against interception.

FIG. 6 illustrates, in the same way as FIG. 5 shows, an example where the distributor 1 codes one packet or the plurality of packets and sends the packet(s) to the integrator 2. It is herein considered that as the coding parameters, the data dividing count is set to "7", and the decoding threshold value is set to "5". The components explained referring to FIG. 1 are marked, in FIG. 6, with the same numerals and symbols as those in FIG. 1, and their explanations are omitted. It is considered in FIG. 6 that the information blocks c2, c5 and c7 are intercepted on the single communication route before the integrator 2 receives these information blocks. In the case of the example shown in FIG. 6, the decoding of the information blocks into the communication information requires the five pieces of information blocks at the minimum. On the other hand, the number of the information blocks intercepted on the communication route is "3". Hence, a person who intercepted this communication is unable to decode into the communication information by using the information blocks intercepted from on the single communication route even when intercepting also the decoding parameters.

THIRD EXAMPLE

The communication control apparatus according to a third example of the present invention will be explained with reference to the drawing in FIG. 7.

The third example exemplifies that this communication control apparatus can switch over a wireless antenna to be used without any interruption of the communications.

Figure 7:
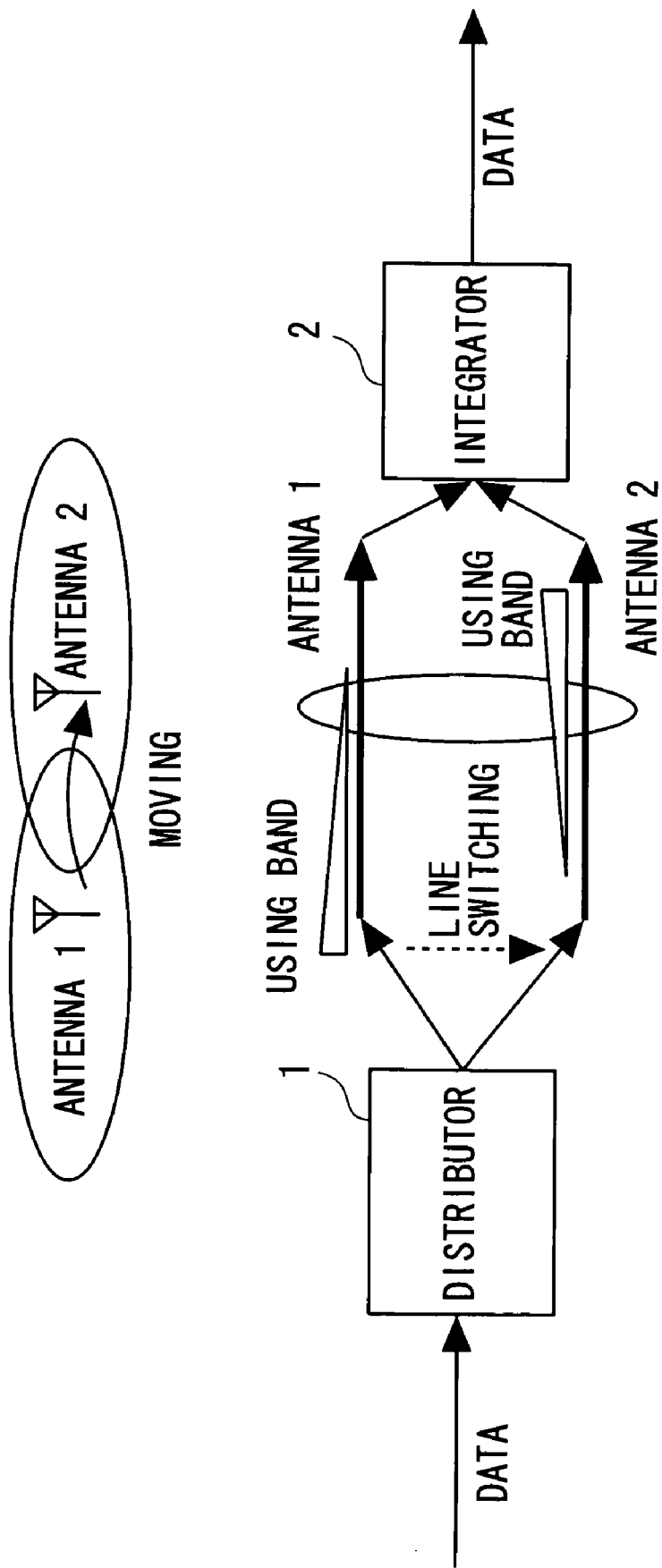
FIG. 7 is a diagram showing how the communication control apparatus of the present invention switches over a communication route without any interruption of the communications.

FIG. 7 shows an example in which the communication control apparatus switches over the communication route from an antenna 1 to an antenna 2. The components explained referring to FIG. 1 are marked, in FIG. 7, with the same numerals and symbols as those in FIG. 1, and their explanations are omitted. The multi-route communication management unit 5A gives the distribution unit 4 an indication as the distribution parameter for distributing the information blocks to the individual communication route while always monitoring a transmitting speed of the communication route, an intensity of the wireless signal, a packet loss rate, a magnitude of the jitter, communication route usability/non-usability and so on. Next explanation is an example, wherein the communication using the antenna 1 exhibits at the beginning a better evaluation value of the QoS than by using the antenna 2, however, the communication using the antenna 2 exhibits thereafter a better evaluation value of the QoS than by using the antenna 1. In this case, the distribution unit 4, in accordance with the evaluation value "e(i)" of the QOS, gradually decreases the information block count of the information blocks to be sent to the antenna 1, and gradually increases the information block count of the information blocks to be sent to the antenna 2. Further, the integrator 2, when receiving arbitrary m-pieces of information blocks in the n-pieces of information blocks irrespective of which communication route the information blocks are sent via, can decode these information blocks. Accordingly, the communication control apparatus can switch over the wireless antenna without any interruption of the communications in the case of switching over the wireless antenna.

Moreover, the communication control apparatus switches over the communication route by changing, per communication route, an information block distribution count on the basis of the evaluation value "e(i)" of the QoS, and can therefore restrain the processing load needed for synchronization etc. between the transmitters/receivers.

Figure 8:
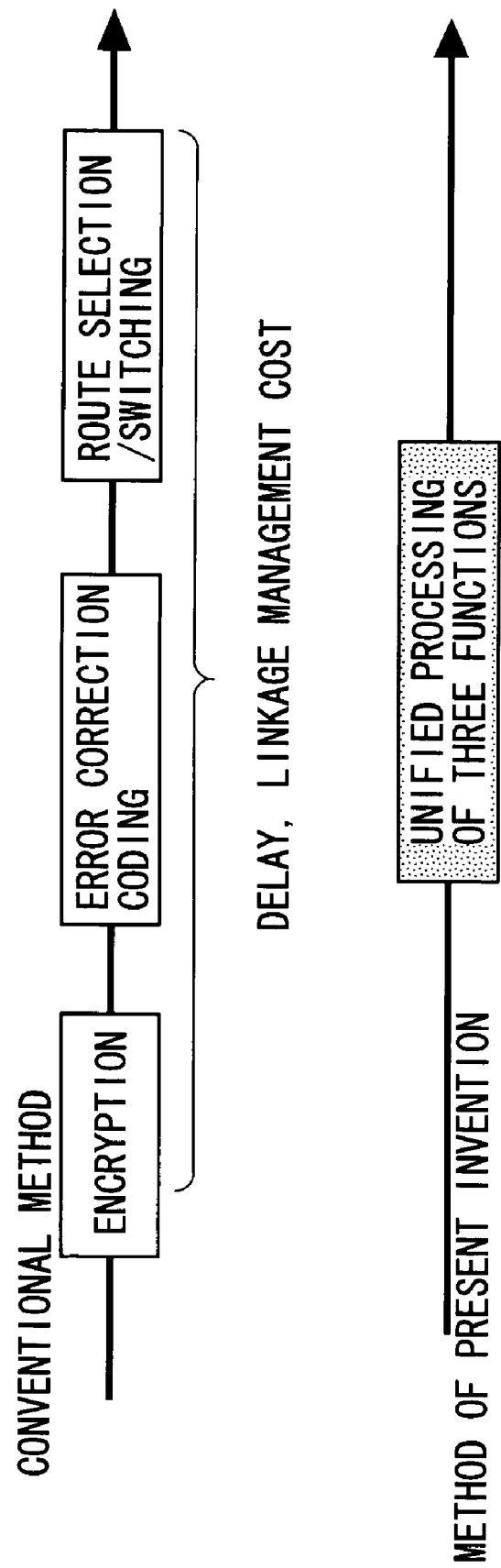
FIG. 8 is a diagram showing that the communication control apparatus of the present invention has an encrypting function, an error correction coding function and a communication route switching function.

From the above, as shown in FIG. 8, the communication control apparatus to which the present invention is applied can ensure (encrypting function) the security against the interception, keep the quality (error correcting coding function), restrain the jitter and switch over (route selecting/switching function) the communication route without any interruption of the communications in an integrated system. Hence, the communication control apparatus is the system in which these technologies are integrated, and can therefore restrain both of the processing time needed for executing these technologies and the number of the adjusting parameters required for the respective methods in the prior arts.

Further, the stabilizing device can be used for communication networks other than the Internet.

INCORPORATION BY REFERENCE

The disclosures of Japanese patent application No. JP2005-173973 filed on Jun. 14, 2005 including the specification, drawings and abstract are incorporated herein by reference.

What is claimed is:

1. A communication control apparatus comprising:
a coding unit coding by a type of coding method, wherein communication information is divided into a plurality of information blocks by said type of coding method and a number of the information blocks equal to or larger than a predetermined threshold value are needed in order to decode the information blocks into the original communication information;
an allocating unit allocating, when there are two or more usable communication routes in the case of sending the information blocks to a partner communication apparatus, the number of the information blocks to be sent per communication route, for each of the two or more usable communication routes; and
a unit sending the allocated number of information blocks to each of the communication routes, wherein
the allocating unit changes, when the number of the information blocks allocated to one of two or more usable communication routes exceeds the predetermined threshold value which indicates the number of the information blocks needed in order to decode, the number of the information blocks allocated to the one of two or more usable communication routes in such a way that the number is set less than the predetermined threshold value.

2. A communication control apparatus according to claim 1, wherein the coding unit uses an SSS (Secret Sharing Scheme) coding method.

3. A communication control apparatus according to claim 1, wherein
the allocating unit further includes:
a unit calculating an evaluation value representing a communication quality of every communication route; and
a unit allocating the information blocks at a predetermined rate to each of the communication route from the communication route exhibiting the largest evaluation value sequentially.

4. A communication control apparatus comprising:
a receiving unit receiving information blocks sent by a method comprising:
a coding step of coding by a type of coding method, wherein communication information is divided into a plurality of information blocks by said type of coding method and a number of the information blocks equal to or larger than a predetermined threshold value are needed in order to decode the information blocks into the original communication information;
an allocating step of allocating, when there are two or more usable communication routes in the case of sending the information blocks to a partner communication apparatus, the number of the information blocks to be sent per communication route, for each of the two or more usable communication routes; and
a step of sending the allocated number of information blocks to each of the communication routes, wherein
the allocating step changes, when the number of the information blocks allocated to one of two or more usable communication routes exceeds the predetermined threshold value which indicates the number of the information blocks needed in order to decode, the number of the information blocks allocated to the one of two or more usable communication routes in such a way that the number is set less than the predetermined threshold value; and
a unit decoding the information blocks into the communication information by using the information blocks with a number of the threshold value needed for decoding the information blocks received by the receiving unit into the communication information.

5. A communication control method comprising:
a coding step of coding by a type of coding method, wherein communication information is divided into a plurality of information blocks by said type of coding method and a number of the information blocks equal to or larger than a predetermined threshold value are needed in order to decode the information blocks into the original communication information;
an allocating step of allocating, when there are two or more usable communication routes in the case of sending the information blocks to a partner communication apparatus, the number of the information blocks to be sent per communication route, for each of the two or more usable communication routes; and
a step of sending the allocated number of information blocks to each of the communication routes, wherein
the allocating step changes, when the number of the information blocks allocated to one of two or more usable communication routes exceeds the predetermined threshold value which indicates the number of the information blocks needed in order to decode, the number of the information blocks allocated to the one of two or more usable communication routes in such a way that the number is set less than the predetermined threshold value.

6. A communication control apparatus according to claim 1, wherein the allocating unit further includes:
a unit calculating an evaluation value representing a communication quality of every communication route; and
a unit allocating the information blocks at a predetermined rate to each of the communication route from the communication route exhibiting the smallest evaluation value sequentially.

7. A communication control method according to claim 5 wherein the coding step uses an SSS (Secret Sharing Scheme) coding method.

8. A communication control method according to claim 5, wherein the allocating step includes further executing:
a step of calculating an evaluation value representing a communication quality of every communication route; and
a step of allocating the information blocks at a predetermined rate to each of the communication route from the communication route exhibiting the largest value sequentially.

9. A communication control method according to claim 5, wherein the allocating step includes further executing:
a step of calculating an evaluation value representing a communication quality of every communication route; and
a step of allocating the information blocks at a predetermined rate to each of the communication route from the communication route exhibiting the smallest value sequentially.

10. A communication control method performed by a communication control apparatus, comprising:
a receiving step of receiving by the communication control apparatus information blocks sent by a method comprising:
a coding step of coding by a type of coding method, wherein communication information is divided into a plurality of information blocks by said type of coding method and a number of the information blocks equal to or larger than a predetermined threshold value are needed in order to decode the information blocks into the original communication information;
an allocating step of allocating, when there are two or more usable communication routes in the case of sending the information blocks to a partner communication apparatus, the number of the information blocks to be sent per communication route, for each of the two or more usable communication routes; and
a step of sending the allocated number of information blocks to each of the communication routes, wherein
the allocating step changes, when the number of the information blocks allocated to one of two or more usable communication routes exceeds the predetermined threshold value which indicates the number of the information blocks needed in order to decode, the number of the information blocks allocated to the one of two or more usable communication routes in such a way that the number is set less than the predetermined threshold value;
a step of decoding by the communication control apparatus the information blocks into the communication information by using the information blocks of which the number is coincident with the threshold value needed for decoding into the communication information in the information blocks received in the receiving step; and
a step of sending by the communication control apparatus the communication information decoded in the step of decoding.

* * * * *